Dec. 19, 1933.         C. F. LAUTZ         1,940,258
CONNECTING LINK
Filed March 4, 1932
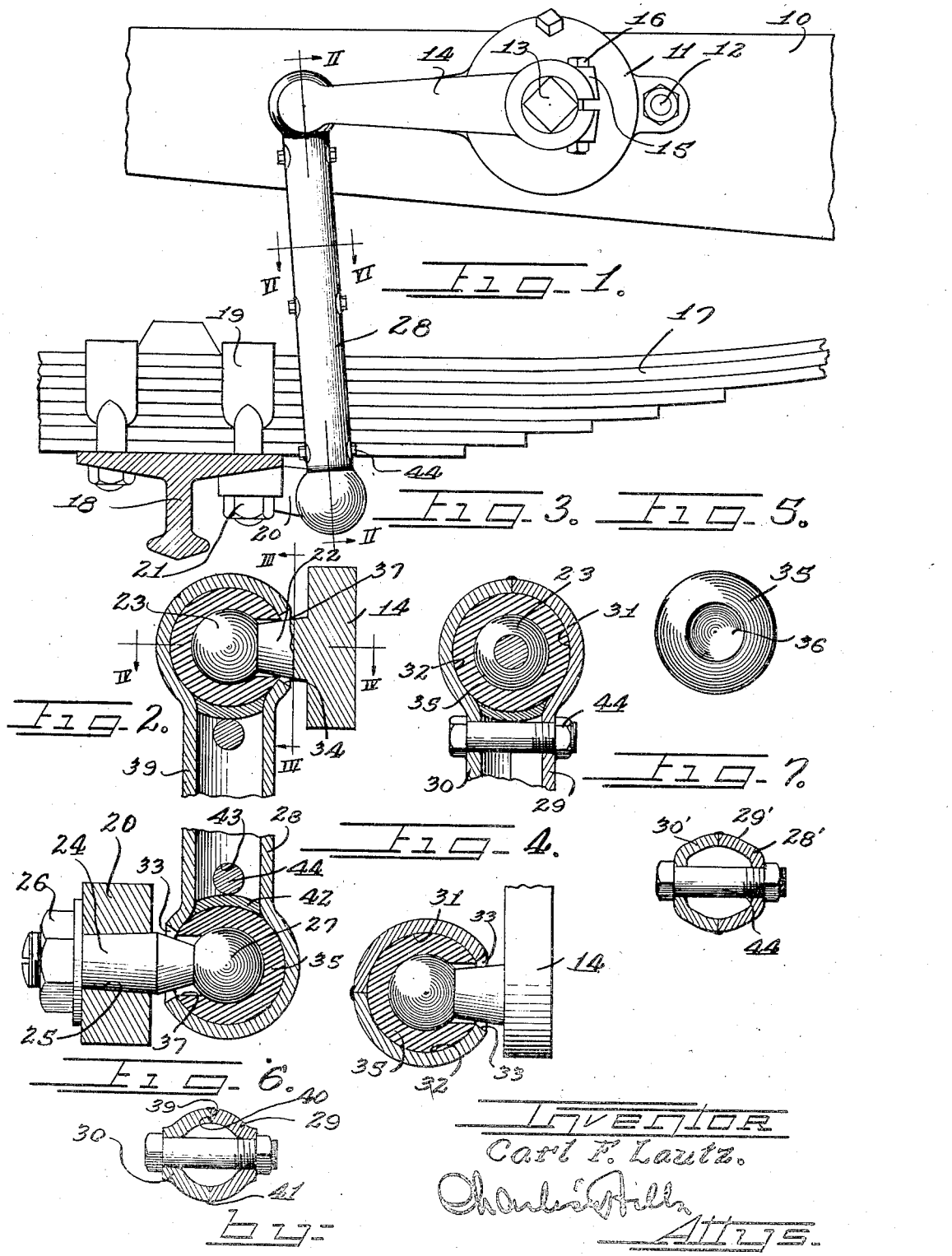

Patented Dec. 19, 1933

1,940,258

UNITED STATES PATENT OFFICE 1,940,258

CONNECTING LINK

Carl F. Lautz, Buffalo, N. Y., assignor to Houde Engineering Corporation, Buffalo, N. Y., a corporation of New York Application March 4, 1932. Serial No. 596,691

3 Claims. (Cl. 29—84)

This invention relates to connecting links and particularly to connecting links for shock absorbers and is a continuation in part of my copending application, Serial No. 481,881, filed September 15, 1930, and patented June 6, 1933, No. 1,912,780.

This invention relates particularly to connecting links having oscillatory joints, the studs of which are made integral with or rigidly attached to their supporting members. In such constructions, the stud member cannot be passed through the socket opening.

It is therefore an object of this invention to provide a connecting link which is formed of longitudinal complimentary sections for quick assembly with cooperating stud members.

It is a further particular object of this invention to provide a connecting link of two members which can be closed over aligned rubber covered studs and firmly united.

It is also an object of this invention to provide a connecting link assembly which can be installed after the associated parts are assembled.

It is a particular object of this invention to provide a connecting link assembly having resilient bushings for allowing oscillatory movement, which assembly can be constructed about the parts to be connected thereby.

It is a still further object of this invention to provide a novel expedient and easy method of assembling a connecting link.

Other and further important objects of this invention will be apparent from the disclosures in the specification and the accompanying drawing.

This invention (in a preferred form) is illustrated in the drawing and hereinafter more fully described.

In the drawing:

Figure 1 shows an adaptation of my invention in use on an automobile in connection with a shock absorber.

Figure 2 is an enlarged sectional view taken substantially on the line II—II of Figure 1.

Figure 3 is a sectional view taken substantially on the line III—III of Figure 2.

Figure 4 is a sectional view taken substantially on the line IV—IV of Figure 2.

Figure 5 is an elevational view of a resilient cushioning member.

Figure 6 is a sectional view taken substantially on the line VI—VI of Figure 1, and Figure 7 is a view similar to Figure 6 showing a slightly modified form of the invention.

As shown on the drawing:

The connecting link and associated joints of this invention may be used in connection with automobiles such as for tie rods and drag link connections in the steering mechanism but I have illustrated it in use on an automobile shock absorber. In Figure 1, reference numeral 10 indicates an automobile channel or side frame member. The shock absorber 11 is connected thereto by the usual bolt means 12 and the shock absorber is provided with the usual rock arm 13, about which a lever 14 is attached by means of the yoke 15 and bolt 16.

The reference numeral 17 indicates an automobile spring mounted on the axle 18 by the spring clip 19. A bracket 20 is secured to the axle 18 by a bolt 21 which may be the extension of the clip 19.

From reference to Figure 2, it will be seen that the arm or lever 14 on the shock absorber 11 is provided with a stud 22 having the usual sperical stud head 23. Likewise, a stud 24 extends through an aperture 25 in the bracket 20 and is secured thereto by the nut 26. The stud 24 is provided with a stud head 27.

The stud heads 23 and 27 are connected by a drag link 28. The drag link 28 is made up of two longitudinal sections 29 and 30, preferably formed of stamped sheet metal. Each section 29, 30 is provided at its ends with enlarged segmental spherical recesses 31 and 32 for the reception of a bushing member as will later appear. An arcuate cut 33 is made in the edges of each of the sections adjacent each of the segmental spherical recesses so that when these sections are mated and the segmental spherical recesses are aligned so as to form substantially spherical socket members, each socket member has a circular opening 34 giving entrance thereto.

This construction of the socket members permits the assembly of studs and bushing before the drag link is assembled, as will later appear.

A resilient bushing 35 preferably formed of rubber is provided for each stud member. The rubber bushing is preferably spherical in shape and has a spherical recess 36 therein having an opening 37 giving entrance thereto.

The rubber bushing 35 is molded to shape with the ball receiving recess 36 therein. The ball receiving recess is of such size that the bushing frictionally grips the ball. The bushing fits snugly in the completed socket and is held under compression by the walls thereof so that there is no relative surface movement or slippage between the bushing and ball or socket but movement of the stud with respect to the link is permitted due to the interparticle flow of the bushing material. As is known, this allows rotative and angular movement of the stud without a consequent wearing of the bushing material. The bushing 37 is made larger than the stud shank so as not to interfere with the movement of the stud.

In assembling the drag link assembly, the rubber bushings 35 are forced over the stud heads 23 and 27 and the sections 29 and 30 are applied thereto in such a manner that the bushing covered stud members are received in the recesses 31 and 32.

The shell members 29 and 30 are applied to each other and to the studs so that the cuts 33 and 34 form circular openings about the shanks of the studs 22 and 25 of larger diameter than said shanks but smaller than the heads thereof. The shell sections 29 and 30 are provided with a number of aligned apertures 43 through which bolts 44 extend. Seat members 42 are provided and these are inserted between the bushings 35 and the reduced portions of the shell sections. The nuts on bolts 44 are tightened to draw the shell sections together. The edges 39 and 40 of the shell sections are thus brought into abutting position. These end edges are preferably spot welded as at 41 to form the permanent link 28.

One of the features of this construction is that the stud members can be assembled on the spring and on the shock absorber arm and then the drag link can be applied. This procedure serves to economize on labor in forming the drag link assembly and provides an easy assembly when the connected parts are in a location not easy of access.

Figure 7 illustrates a slight modification of the drag link assembly. In this construction, the drag link 28' is formed of two shell sections which are united in a manner similar to that described to form a drag link which is hexagonal in cross section rather than circular. It will be understood that many other shapes are contemplated and the drag link can be made to any polygonal cross section or may be made irregular so as to give a maximum strength per unit weight.

It will be seen by this invention there is provided a drag link assembly which is particularly advantageous in that it can be applied to an assembled structure. The drag link assembly has been described in connection with a shock absorber but it will be understood that it may be used anywhere that a connecting rod is needed.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The method of forming a connecting link assembly, which comprises forming a link in two complementary sections having end recesses and peripheral mating edges provided with notches to afford openings into said recesses, positioning resilient bushings on the heads of studs having their axes lying in the same plane, alining said sections on opposite sides of said plane along their mating edges to receive said bushings in said recesses and fastening said sections together so as to engage said resilient bushings tightly within said end recesses.

2. The method of forming a permanent connecting link assembly, which comprises forming a link in two complementary sections having end recesses and peripheral mating edges provided with notches to afford openings into said recesses, positioning resilient bushings on the heads of studs having their axes lying in the same plane, alining said sections on opposite sides of said plane along their mating edges to receive said bushings in said recesses and permanently securing said sections together in tightened relation so as to engage said resilient bushings tightly within said end recesses.

3. The method of forming a connecting link assembly, which comprises forming a link in two shell sections each having sphere-like end recesses and a communicating restricted intermediate recess, said sections having substantially coextensive peripheral mating surfaces provided with notches affording openings into said end recesses, positioning resilient bushings on the heads of studs having their axes lying in the same plane, alining one of said sections on one side of said plane against said bushings, inserting seat members against said bushings at the ends of the communicating restricted recess, bringing the other of said sections into mating relation and fastening said sections together to hold said seat members in place and to tightly engage said bushings within said end recesses.

CARL F. LAUTZ.